US008543791B2

(12) United States Patent
Shin et al.

(10) Patent No.: US 8,543,791 B2
(45) Date of Patent: Sep. 24, 2013

(54) APPARATUS AND METHOD OF REDUCING PAGE FAULT RATE IN VIRTUAL MEMORY SYSTEM

(75) Inventors: Il-hoon Shin, Suwon-si (KR); Ji-hyun In, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1040 days.

(21) Appl. No.: 11/585,870

(22) Filed: Oct. 25, 2006

(65) Prior Publication Data

US 2007/0101098 A1 May 3, 2007

(30) Foreign Application Priority Data

Oct. 25, 2005 (KR) .......................... 10-2005-0100826

(51) Int. Cl.
  *G06F 12/00* (2006.01)
  *G06F 13/00* (2006.01)
  *G06F 13/28* (2006.01)

(52) U.S. Cl.
  USPC ............ 711/205; 711/206; 711/207; 711/160

(58) Field of Classification Search
  USPC ................... 711/205, 206, 160, 207
  See application file for complete search history.

(56) References Cited

U.S. PATENT DOCUMENTS

| 5,307,495 | A | | 4/1994 | Seino et al. | |
|---|---|---|---|---|---|
| 5,555,395 | A | * | 9/1996 | Parks | 711/145 |
| 5,752,274 | A | * | 5/1998 | Garibay et al. | 711/206 |
| 6,339,816 | B1 | | 1/2002 | Bausch | |
| 6,490,665 | B1 | * | 12/2002 | Lai et al. | 711/160 |
| 6,804,741 | B2 | | 10/2004 | Cowan | |
| 7,809,922 | B2 | * | 10/2010 | Ueda et al. | 711/207 |
| 2006/0075147 | A1 | * | 4/2006 | Schoinas et al. | 710/3 |

FOREIGN PATENT DOCUMENTS

| JP | 06-124234 A | 5/1994 |
|---|---|---|
| JP | 2004-157686 A | 6/2004 |

* cited by examiner

*Primary Examiner* — Stephen Elmore
*Assistant Examiner* — Mark Giardino, Jr.
(74) *Attorney, Agent, or Firm* — Sughrue Mion, PLLC

(57) ABSTRACT

An apparatus for reducing a page fault rate in a virtual memory system includes a page table stored in a main storage unit which stores a reference address so as to read page information from the main storage unit; a buffer unit which stores a portion of the page table; and a processor which reads data from the main storage unit or which stores data in the main storage unit. When changing information for referring to a first page that exists in the page table, the processor performs a task invalidating information related to the first page in the buffer unit. A method of reducing the page fault rate includes resetting reference information stored in the page table; detecting whether the reference information exists in a buffer unit; and invalidating the reference information when the reference information exists in the buffer unit.

12 Claims, 7 Drawing Sheets

RELATED ART    FIG. 3

APPARATUS AND METHOD OF REDUCING PAGE FAULT RATE IN VIRTUAL MEMORY SYSTEM

CROSS-REFERENCE TO RELATED APPLICATION

This application claims priority from Korean Patent Application No. 10-2005-0100826, filed on Oct. 25, 2005, in the Korean Intellectual Property Office, the disclosure of which is incorporated herein by reference in its entirety.

BACKGROUND OF THE INVENTION

1. Field of the Invention

Methods and apparatuses consistent with the present invention relate to a virtual memory system, and more particularly, to reducing a page fault rate in a virtual memory system.

2. Description of the Related Art

Due to the increase in the size of software, a system such as a computer or a laptop computer commonly employs a virtual memory system in which a portion of software is loaded into a memory instead of the entire software.

Further, because a built-in system included in a cellular phone, a smart phone, or a PDA (personal digital assistant) has many functions and is complicated, the type and size of software included in the built-in system are increasing. Therefore, the system increasingly employs a virtual memory technology. For example, in the case of a shadowing technique in which a software code is stored in a NAND (not and) flash memory and batch-loaded into a main memory when booting a system, capacity of the main memory should be increased in proportion to the size of the software. Therefore, there is a need for an effective alternative to execute large software at a reasonable hardware cost. Such an alternative is a virtual memory system that can execute large software by utilizing a minimum capacity of the main memory.

The virtual memory system is used to solve a problem due to an insufficient capacity of a main memory which is much smaller than the size of real software. Specifically, in the virtual memory system, address spaces for all tasks are not loaded into the main memory but address spaces absolutely required for executing present tasks are loaded into the main memory. The address spaces which are not stored in the main memory are stored in an auxiliary memory such as a NAND flash memory or hard disk. Accordingly, it is possible to solve the mismatch between the size of software and the capacity of the main memory.

An address space region which is necessary to execute a task may exist in an auxiliary memory. Therefore, the virtual memory system has a problem that there exists time overhead for loading a page existing in the auxiliary memory to the main memory. Since this time overhead is relatively large as compared with an access time with respect to a page in the main memory, it is very important for system performance to minimize a page loading frequency from the auxiliary memory.

In order to minimize the page loading frequency from the auxiliary memory, a page more likely to be referenced should be loaded into the main memory and a page less likely to be referenced should be stored in the auxiliary memory. That is, when a new page is loaded into the main memory, if the main memory does has enough empty space, a page least likely to be referenced in the immediate future should be replaced from the main memory among the existing loaded pages.

That is, in order to improve the system performance, it is very important to estimate reference probability of each page.

As shown in FIG. 1, a virtual memory system includes a CPU (central processing unit) 10, a cache memory 20, a TLB (translation lookaside buffer) 30, a main memory 40, an auxiliary memory 50, and a page table 45. A page necessary to execute a task is loaded into the main memory 40 so as to be executed and a cache memory 20 functions as a cache with respect to the main memory 40. The TLB 30 and the page table 45 serve to convert a virtual address to a physical address in the main memory. The page table 45 resides in the main memory and the TLB 30 functions as a cache of the page table 45.

In a related art virtual memory system, the CPU 10 accesses an arbitrary instruction or data in order to execute a program as follows.

(1) A CPU refers to a virtual address and performs indexing of a cache memory using the virtual address so as to determine whether or not desired data exists in the cache memory. If the desired data exists in the cache memory, the CPU fetches the data.

(2) If the corresponding data does not exist in the cache memory, the CPU performs indexing the TLB so as to detect a physical address of a page in which the desired data exist (2-1). If the physical address is detected in the TLB, the CPU accesses the page in the main memory and reads the desired data by using the corresponding information (2-2).

(3) If the physical address of data to read is not detected in the TLB, the CPU performs indexing a page table of the main memory so as to obtain the physical address of the data (3-1). At this moment, the data may exist in the main memory or in the auxiliary memory. If the data exists in the main memory, the CPU accesses the corresponding page and reads the data (3-2).

(4) If the data does not exist in the main memory, a page fault occurs. If a page fault occurs, a page fault handler is executed such that the corresponding page is loaded into the main memory from an auxiliary memory by using a virtual address of the page in which the page fault occurs. At this moment, if the main memory does not have an empty room enough to store a new page, a page having the lowest reference probability among the existing pages is replaced so as to store the new page in the room of the replaced page.

In a general system, hardware processes the procedures (1) to (3) except for the procedure (4) in which the page fault occurs among the above-described procedures (1) to (4). That is, generally, the procedures (1) to (3) are not performed by software. Therefore, software can not obtain information that indicates the page accessed by the CPU in the procedure (1) to (3) but only can obtain information that indicates a page in which the page fault occurs through the procedure (4). Accordingly, when evaluating the reference probability of each page, it is difficult to realize a LRU (least recently used) page replacement policy in which all of the page access information should be known.

Since the LRU policy can not be used in the virtual memory system as a page replacement policy, an NUR (not used recently) policy, such as a clock, is used. In order to use the NUR policy, an access bit is added in a page table entry as reference number 46 shown in FIG. 1. When an arbitrary page is accessed, hardware automatically sets the access bit of the corresponding page table entry to 1. By using this access bit, it can be known whether or not the page is recently accessed.

There are various NUR page replacement policies in which the access bit is utilized. For example, Mach operating system version 2.5 realizes the NUR policy by using two connection lists which include a page of access bit 1 or 2. Further, a clock page replacement policy realizes the NUR policy by using one connection list and two pointers.

FIG. 2 is a view showing a related art clock policy. In the clock policy, all of the pages in the main memory are managed as one circle list and there are two arms. A back arm 61 is used to replace a page and a front arm 62 is used to reset an access bit of the page. That is, when a page fault occurs, the back arm 61 detects pages stored in the main memory according to a round-robin method so as to replace a first page in which an access bit is 0. At this moment, the front arm 62 also accesses the pages according to the round-robin method and initializes the access bit of the accessed pages to 0. A predetermined value of an interval between the front arm 62 and the back arm 61 is always kept.

A clock replacement policy guarantees that a page recently referenced, that is, a page having an access bit of 1 is not replaced in the main memory during a predetermined period of time such that the clock replacement policy may show a similar function to the LRU. On the other hand, hardware which does not supply the access bit may emulate the access bit of the page table entry in software so as to realize NUR page replacement policy, such as the clock replacement policy.

A disadvantage of the page replacement policy in which the related art access bit is utilized or realized by emulating the access bit in software is that recently referenced information of a page in which the access bit is reset to 0 can be omitted.

For example, in the case that a clock page replacement policy is used, if an access bit of an arbitrary page is reset to 0 by the front arm, there is no modification with respect to a TLB entry of the corresponding page. Therefore, a procedure 2-1 shown in FIG. 1, that is, when a physical address of a page to be accessed is found in the TLB, the access bit of the corresponding page is not set to 1. When an entry is found in the TLB, the CPU does not access the page table, but accesses the main memory through procedure 2-2 such that there is no modification with respect to the page table.

FIG. 3 is a view showing an operation of the page replacement according to the related art.

In a block 71, while a predetermined page is replaced according to a page replacement policy, an access bit with respect to a page K included in a page table 47 is reset to 0 (S1).

In a block 72, when a CPU 11 attempts to read the page K, the CPU 11 refers to the TLB 31 (S2). Therefore, the CPU 11 does not modify the access bit of the page table 47 and directly accesses the page K (S3). As a result, even though the page K is accessed by the CPU 11, the access bit of the page table 47 remains as 0.

In a block 73, the page K is replaced according to the page replacement policy. Since the access bit of the page table 47 with respect to the page K is reset to 0, the page K is removed by the back arm. However, since the page K referred to in the block 72 is removed, the CPU 11 should read the page K again from the auxiliary memory when reading the page K afterward.

Recently, there is a problem that reference information of a recently referred page is omitted so that the recently referred page is replaced in the main memory. As a result, a page loading frequency from the auxiliary memory increases such that the entire system performance may be degraded.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

An aspect of the present invention modifies a TLB when an access bit is reset in the case of performing a page replacement policy.

An aspect of the present invention also improves the overall performance by not detecting the TLB with respect to a reset page of a page table, so as to reduce a frequency of the page fault in which data is read from an auxiliary memory.

According to an aspect of the present invention, an apparatus for reducing page fault rate in a virtual memory system includes a page table stored in a main storage unit and storing a reference address so as to read page information from the main storage unit; a buffer unit storing a portion of the page table; and a processor reading data from the main memory storage or storing data in the main storage unit. When changing information for referring to a first page existing in the page table, the processor performs a task invalidating the information on the first page in the buffer unit.

Further, according to another aspect of the invention, a method of reducing page fault rate in a virtual memory system includes resetting reference information stored in a page table so as to remove a first page stored in a main storage unit according to a page replacement policy to be performed; detecting whether or not the reference information on the reset first page exists in a buffer unit; and invalidating the reference information on the reset first page when the reference information of the reset first page exists in the buffer unit.

BRIEF DESCRIPTION OF THE DRAWINGS

The above aspects of the present invention will be more apparent by describing exemplary embodiments of the present invention with reference to the attached drawings, in which.

DETAILED DESCRIPTION OF EXEMPLARY EMBODIMENTS

Figure 1:
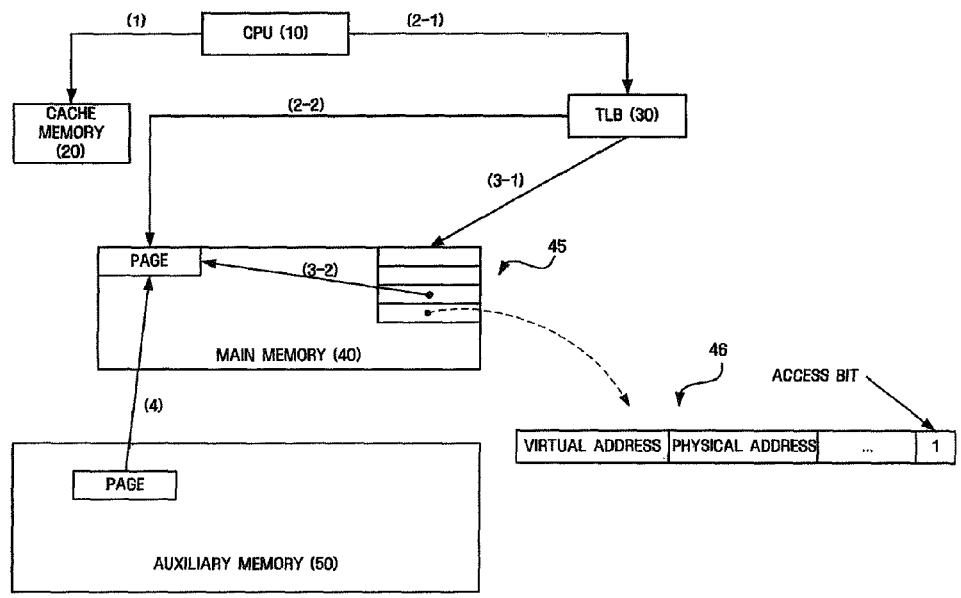
FIG. 1 is a view showing a configuration of the virtual memory system according to the related art.

Advantages and features of the present invention and methods of accomplishing the same may be understood more readily by reference to the following detailed description of exemplary embodiments and the accompanying drawings. Like reference numerals refer to like elements throughout the specification.

Hereinafter, an apparatus and method of reducing a page fault rate in a virtual memory system will be described according to exemplary embodiments of the present invention by referring to the drawings of block diagrams and a flowchart. It can be understood that each of blocks of the flowchart and combination of the flowchart can be executed by using computer program instructions. Since the computer program instructions can be included in a processor of a general computer, a specific purposed computer, or a programmable data processing device, the instructions executed by the processors of the computer or another programmable data processing device may create a unit which executes functions described in the block of the flowchart. These computer program instructions can be stored in a computer usable memory or computer readable memory which can aim at a computer or another programmable data processing device so as to implement the computer program instruction in a specific manner. The instructions stored in the computer usable memory or the computer readable memory can produce manufactured items including the instruction units which execute the functions described in the blocks in the block of the flowchart. Since the computer program instructions can be included in a computer or another programmable data processing device, the instructions—which create a process in which a series of operation stages are performed on the computer or another programmable data processing device—are executed by a computer and cause the computer or another programmable data processing device to supply procedures so as to execute the functions described in the blocks of the flowchart.

Further, each block can represent, for example, a module, a segment, or a part of codes which includes one and more executable instructions for executing a specific logic functions. In addition, in some modified exemplary embodiments, it should be understood that the function described in the blocks can be executed in a different order. For example, two adjacent blocks can be substantially performed at the same time or can be performed in reverse order in accordance with a function corresponding to the block.

Figure 4:
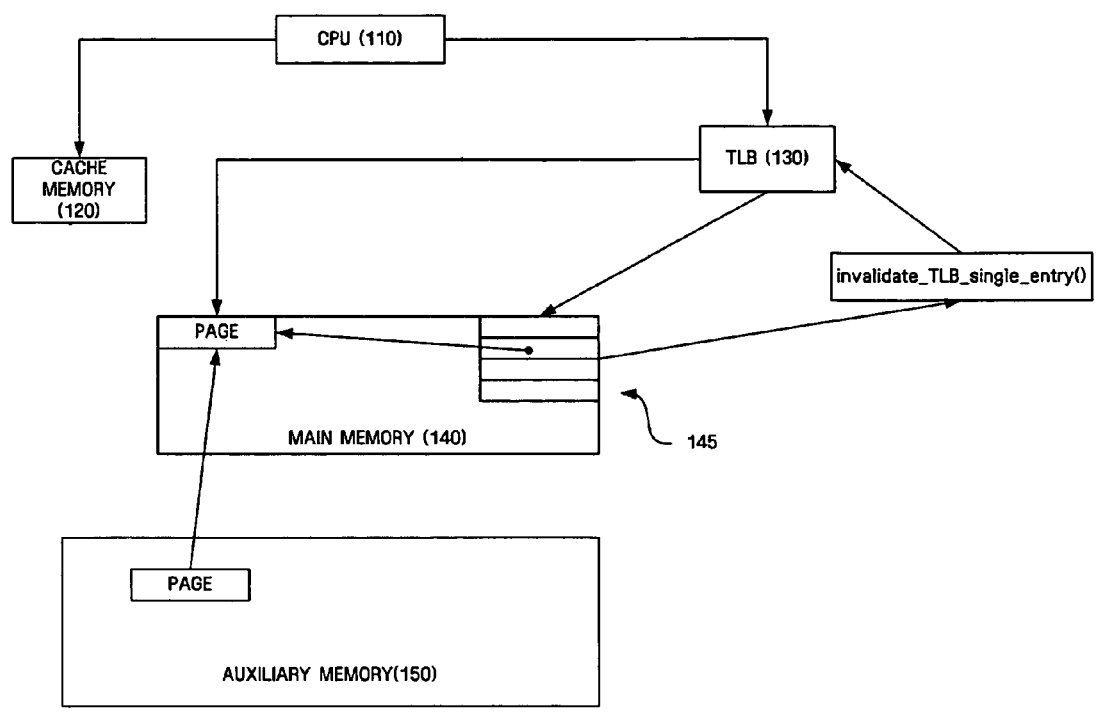
FIG. 4 is a view showing a configuration of a virtual memory system according to an exemplary embodiment of the present invention.

FIG. 4 is a view showing a configuration of a virtual memory system according to an exemplary embodiment of the present invention.

The virtual memory system includes a CPU 110, a cache memory 120, a TLB (translation look-aside buffer) 130, a main memory 140, and an auxiliary memory 150. The main memory 140 may be a memory device having a high input/output speed, such as a DRAM (dynamic random access memory) or an SRAM (static random access memory). On the other hand, the auxiliary memory 150 is a storage device, such as a NAND flash memory or a hard disk, which can retain data stored in it even when power is not supplied to it.

In FIG. 4, when data does not exist in the cache memory 120, the CPU 110 can read data from the main memory 140 by detecting the TLB 130. In addition, when the data does not exist in the TLB 130, the CPU 110 can read data in the main memory 140 by reading a page table 145 of the main memory 140.

The CPU 110 can more rapidly read the data from the TLB 130 than the page table 145. On the other hand, when the data does not exist in the TLB 130, the CPU 110 reads the data from the main memory 140 through the page table 145. When the data does not exist in the page table 145, the CPU 110 determines that page fault occurs and then reads the data from the auxiliary memory 150.

In this process, the CPU 110 stores information corresponding to the newly read page at a location indicated by the back arm in the page table 145. And then, the CPU 110 causes the back arm to indicate next page information in the page table 145 and causes the front arm to indicate the next page information after resetting an access bit of the page information being currently indicated to 0.

On the other hand, the page information stored in the TLB 130 is invalidated by resetting the access bit of the page information to 0. Therefore, the CPU 110 can not read the corresponding page from the TLB 130. That is, when page fault occurs, the CPU 110 resets the access bit of the page information indicated by the front arm to 0 so as not to refer to the page information in the TLB 130. As a result, in order to read the corresponding page, the CPU 110 should read the page by referring to the page table 145. Still, it is difficult to reduce a time for searching the page table 145 by using the TLB 130. However, since the page table is newly loaded into the TLB 130, it is possible to prevent a problem that the page should be read from the auxiliary memory 150 when the corresponding page is replaced in the main memory 140 and does not exist any more.

Figure 5:
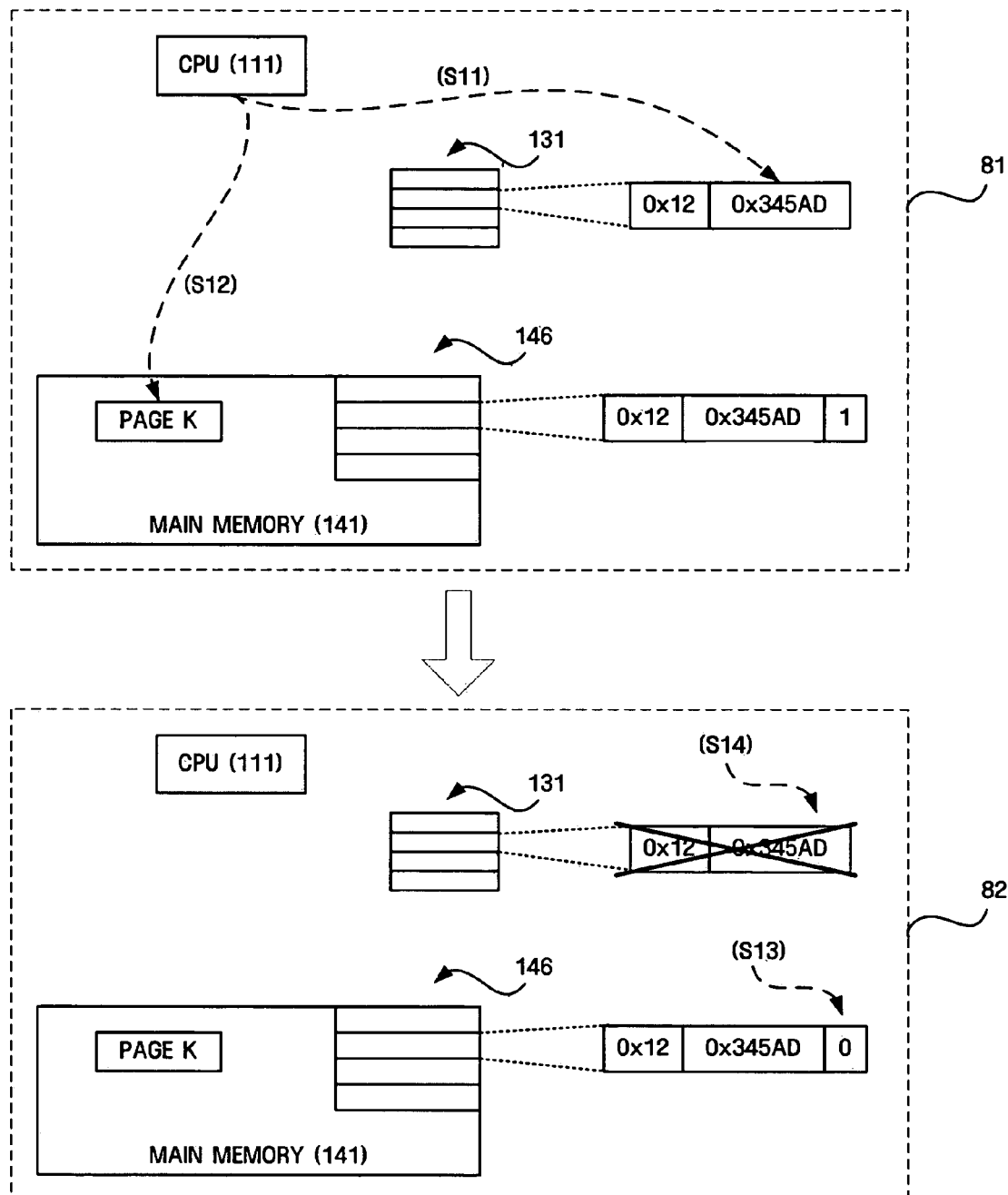
FIG. 5 is a view showing an operation according to an exemplary embodiment of the present invention.

FIG. 5 is a view showing an operation in which a CPU reads a page from a main memory according to an exemplary embodiment of the present invention. In block 81, in order to read data of the page K, a CPU 111 reads an address 0x345AD of the page K through a TLB 131. The TLB 131 includes a virtual address 0x12 and a physical address 0x345AD corresponding to the virtual address. The CPU 111 reads the physical address 0x345AD from the TLB 131 (S11) so as to read the page K stored in the main memory 141 (S12). A page table 146 stores information with respect to the page K and an access bit of the page K is set to 1.

In block 82, while a predetermined page is replaced according to a page replacement policy, the access bit of the page K in the page table 146 is reset to 0 (S13). And then, the information on the page K in the TLB 131 is invalidated (S14). Accordingly, in order to read page K afterward, the CPU 111 should refer to the page table 146 and can not refer to the TLB 131.

Figure 6:
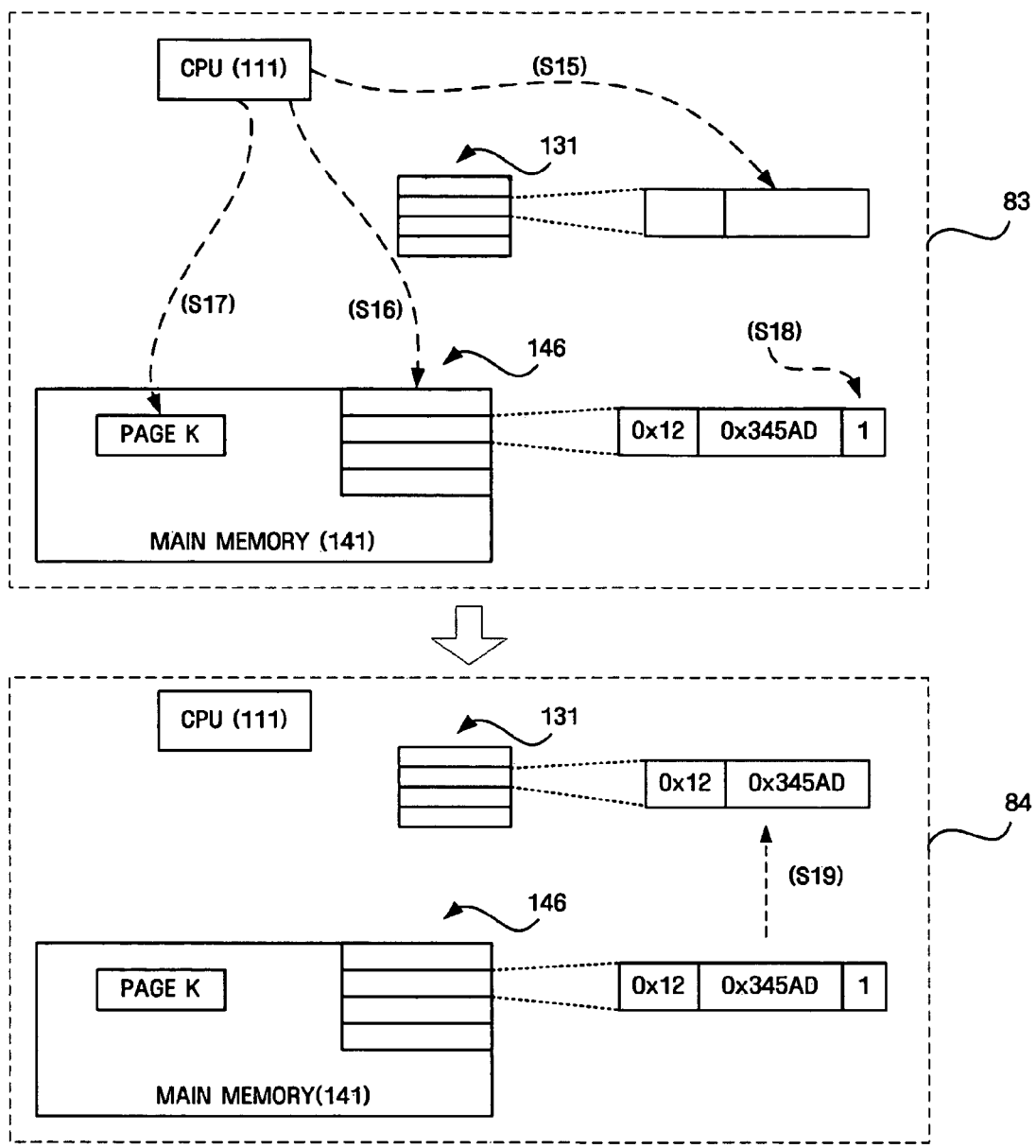
FIG. 6 is a view showing an exemplary embodiment of the present invention following FIG. 5.

FIG. 6 is a view showing an exemplary embodiment of the present invention following FIG. 5. In block 83, it is shown that the CPU 111 accesses the page K after the page replacement in block 82. As described above, since the TLB 131 does not have information corresponding to the page K (S15), the CPU 111 searches the page table 146 (S16). As a result of searching the page table 146, the CPU 111 can grasp a location of the page K and thus read the page K (S17). Further, the CPU 111 sets an access bit of the page table 146 with respect to the page K to 1 so as to inform that the page K has been referred (S18).

Figure 3:
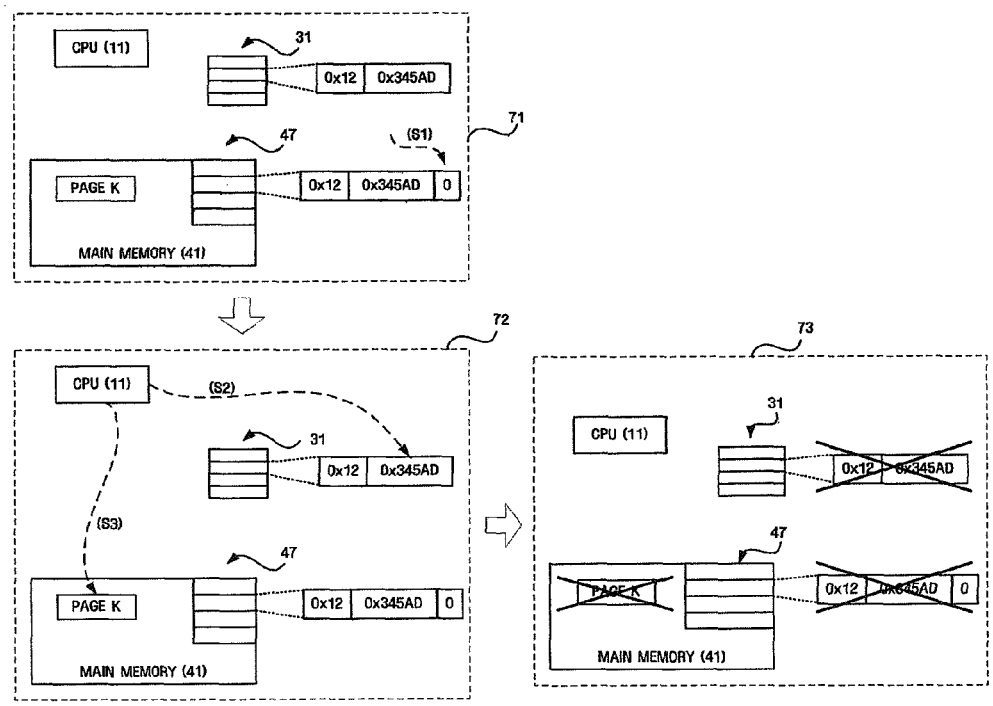
FIG. 3 is a view showing an operation of the page replacement according to the related art.

When the access bit is set to 1 in block 83, reference information of the page K is stored in the TLB 131 (S19), as shown in block 84. As a result, it is possible to prevent the page K from being replaced and disappearing as shown in FIG. 3. Therefore, a process of reading data from the auxiliary memory is removed such that the efficiency of reading data increases.

The term "~unit", that is, "~module" or "~table", as used herein, means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided in the modules may be combined into fewer modules or further separated into additional modules. Further, the modules can be realized so as to regenerate one or more CPUs in a device.

Figure 7:
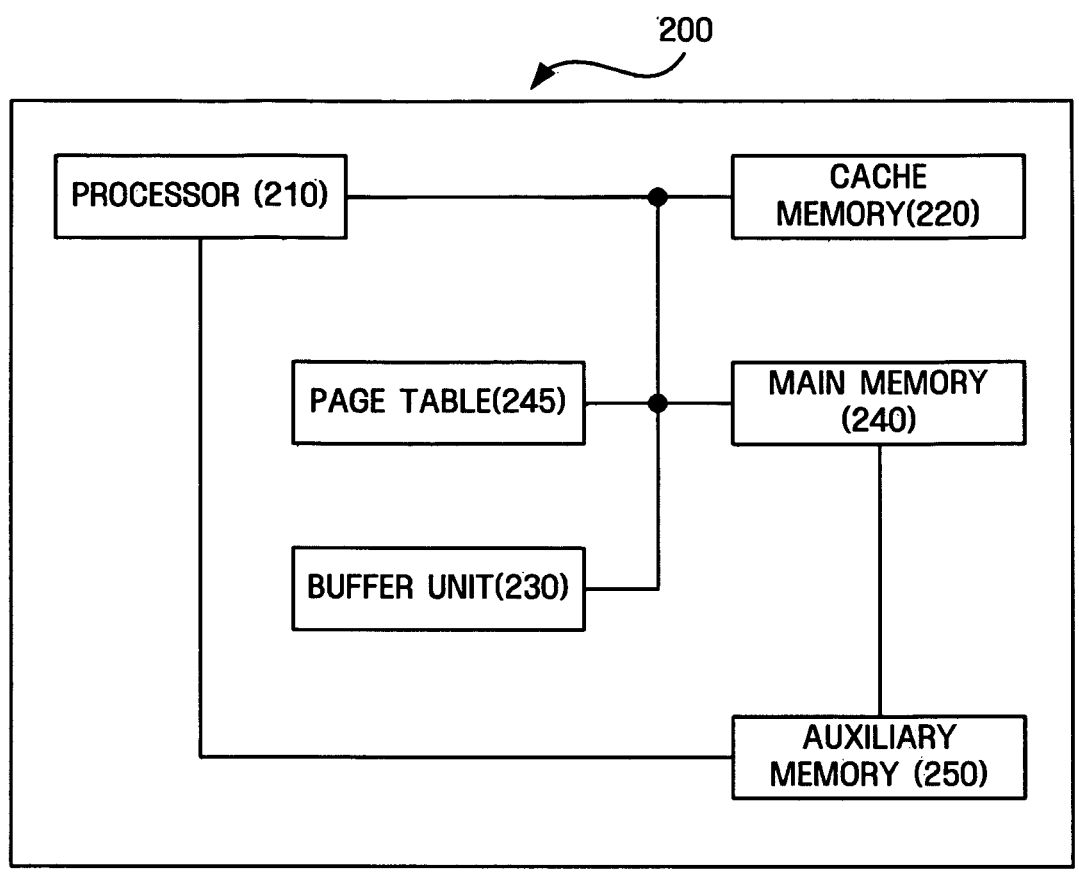
FIG. 7 is a block diagram showing a configuration of a memory system according to an exemplary embodiment of the present invention.

FIG. 7 is a block diagram showing a configuration of a memory system according to an exemplary embodiment of the present invention. A memory system 200 can be applied to a system such as a computer, laptop computer, PDA, HPC (handheld personal computer), mobile phone, or PMP (portable music player). The memory system 200 can be used in a system to which a virtual memory technique is applied. In FIG. 7, even though a page is used as a unit of replacement task in a main memory, this is only an example and the unit of replacement task is not limited thereto.

The memory system 200 includes a processor 210, a cache memory 220, a buffer unit 230, a main memory 240, a page table 245, and an auxiliary memory 250. The processor 210 reads data stored in the auxiliary memory 250, the main memory 240, and the cache memory 220, and/or stores the data. Further, the processor 210 moves data stored in the auxiliary memory 250 to the main memory 240 or moves the data stored in the main memory 240 to the auxiliary memory 250.

The cache memory 220 can be optionally used. In order to improve a system performance, a semiconductor device whose process speed is higher than that of the main memory 240 is used as the cache memory 220.

The main memory 240 fetches a part of data stored in the auxiliary memory 250 so as to read and write the data quickly. Generally, the auxiliary memory 250 can retain data stored in it even though power is not supplied to it. However, the auxiliary memory 250 has a slower data read/write speed than the main memory 240. Accordingly, in order to reduce degradation of performance due to the slow speed, the main memory 240 is used. As the auxiliary memory 250, a hard disk, a USB (universal serial bus) storage, or a NAND flash memory can be used. The main memory 240 has a faster data read/write speed than the auxiliary memory 250, but the main memory 240 can not retain data stored in it when power is not supplied to it. However, it is not necessary that the main memory 240 has a faster input/output speed than that of the auxiliary memory 250. As the main memory 240, for example, a memory such as a RAM (random access memory) can be selected or a NOR (not or) flash memory can be applied.

Figure 2:
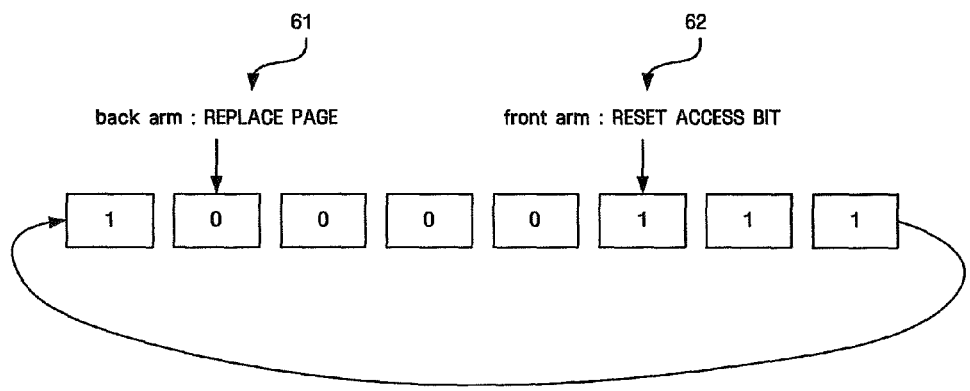
FIG. 2 is a view showing a clock policy according to the related art.

A page table 245 supplies reference information for searching a desired page stored in the main memory 240. The page table 245 is used for mapping a virtual address used by the processor 210 and a physical address used in the main memory 240. Further, the page table 245 includes an access bit or information in which the access bit is emulated in order to replace pages existing in the main memory 240. A method of modifying the access bit so as to replace the page is similar to that described above with respect to FIGS. 2, 5, and 6.

The buffer unit 230, which is a memory device capable of reading data faster than the main memory 240, stores a part of the page table 245 so as to increase the speed of reading the reference information from the page table 245. The buffer unit 230 has the same function as the above-described TLB, that is, it caches the part of the page table 245.

As described with respect to FIGS. 5 and 6, when reference information of the predetermined page in the page table 245 is reset such that the corresponding page can be removed according to the page replacement policy, the processor 210 deletes the information on the page buffered in the buffer unit 230 so as to refer to the main memory 240 through the page table 245 when the processor 210 reads or stores the page afterward. As a result, when the processor 210 reads the corresponding page, even after the reference information is reset in the page table 245, the reference information is reset such that the corresponding page is not replaced by a page replacement task.

Assuming that a speed of reading the page information in the buffer unit 230 is $V_b$, a speed of reading the page information in the page table 245 is $V_p$, a speed of reading the data in the main memory 240 is $V_m$, and a speed of reading the data in the auxiliary memory 250 is $V_s$, the speed difference between the related art method $V_{old}$ and the method $V_{this}$ described in the present specification can be expressed by the following Equation (1).

$$V_{this}=V_p+V_m, \ V_{old}=V_b+V_s$$

$$V_{pbdiff}=V_p-V_b$$

$$V_{msdiff}=V_m-V_s \qquad (1)$$

Here, $V_{pbdiff}$ is a speed difference between the buffer unit 230 and the page table 245 of the main memory 240, which read data by small units such as a bit or a byte. $V_{msdiff}$ is a speed difference between the main memory 240 and the auxiliary memory 250, which read data by the large units of a page. Accordingly, $V_{pbdiff}$ is larger than $V_{msdiff}$ ($V_{pbdiff} > V_{msdiff}$).

Differences between the related art method $V_{old}$ and the method $V_{this}$ suggested in the present specification can be expressed by the following Equation (2).

$$V_{this}-V_{old}=(V_p+V_m)-(V_b+V_s)=(V_p-V_b)+(V_m-V_s)=V_{pbdiff}-V_{msdiff}>0 \qquad (2)$$

So, $V_{this}-V_{old}>0$, that is, $V_{this}>V_{old}$

According to the method suggested in the present specification, the speed is increased over that in the related art. Specifically, since a speed in which data is read from the auxiliary memory 250 largely affects the entire processing performance, it is important to reduce a frequency of reading data from the auxiliary memory 250. According to the method suggested in the present specification, the frequency of reading data from the auxiliary memory 250 can be reduced. As page replacement policy performed by the processor 210, for example, an NUR (not used recently) algorithm or an LRU (least recently used) algorithm can be exemplified.

Figure 8:
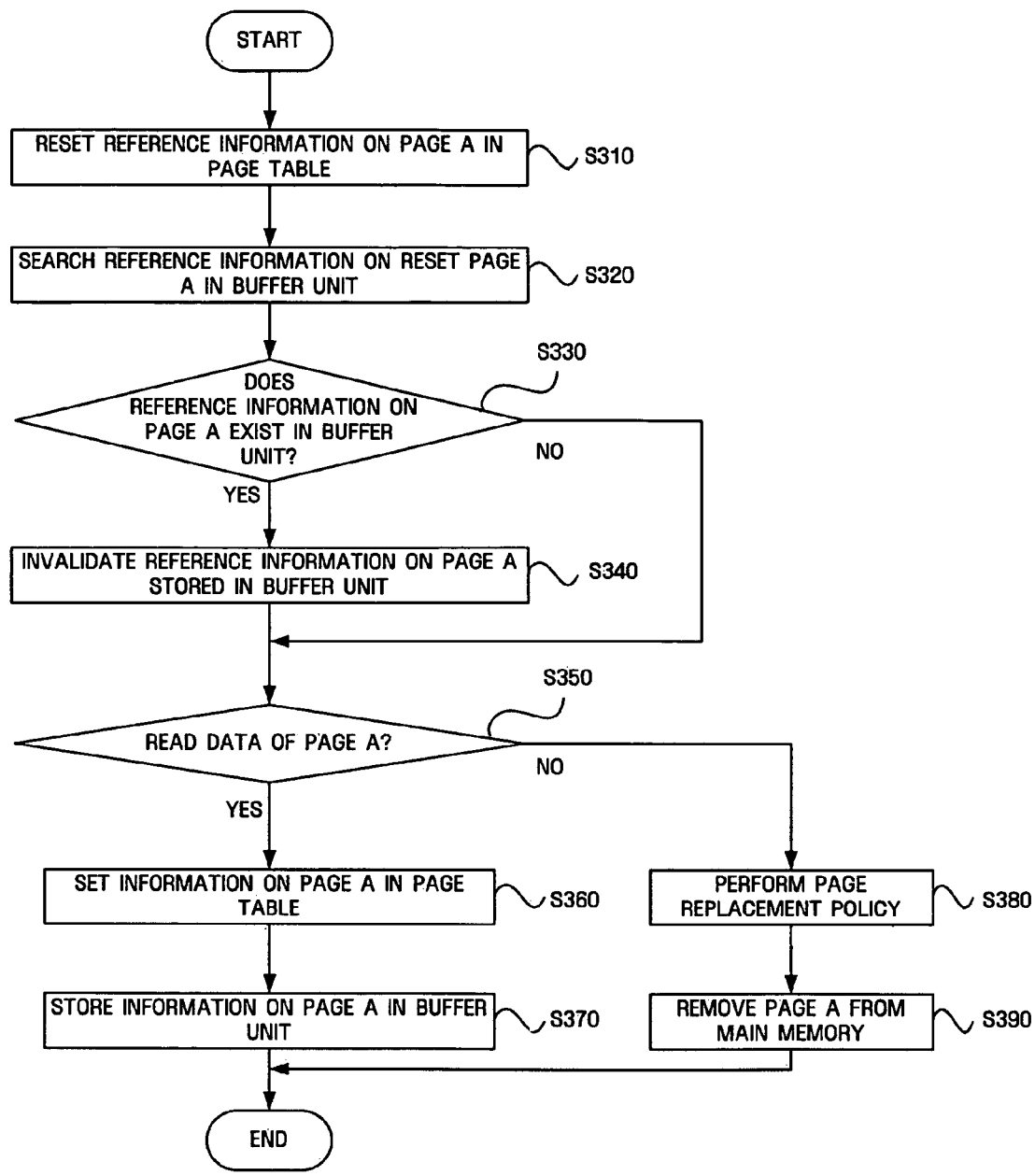
FIG. 8 is a flowchart showing operations according to an exemplary embodiment of the present invention.

FIG. 8 is a flowchart showing operations according to an exemplary embodiment of the present invention. In accordance with movement of the front arm shown in FIG. 2, the CPU resets reference information of a predetermined page stored in the page table (S310). The predetermined page is referred to as page A. The CPU searches the reference information on the reset page A in the buffer unit (S320). The buffer unit caches and stores the page table together with the TLB. If the reference information of the page A exists in the buffer unit (S330), the CPU invalidates the corresponding reference information (S340). And then, if the page A is accessed, the CPU refers to the page table. If the reference information does not exist, the invalidating process is omitted.

Subsequently, when data of the page A is read (S350), reference information on the page A of the page table is set (S360). And then, the reference information on the page A is stored in the buffer unit (S370). When the page A is accessed afterward, the buffer unit is referred instead of the page table.

On the other hand, if the page replacement policy is performed without accessing data of the page A (S380), the page A is removed from the main memory (S390).

According to the present invention, it is possible to solve problems such as reference information omission generated because the TLB entry of the corresponding page is not invalidated when resetting the access bit in a page replacement policy that implements and utilizes the access bit by software or hardware.

Further, according to the present invention, it is possible to reduce the mismatch between the TLB and the page table, and reduce page fault of pages frequently read. As a result, the system performance can be improved by reducing the frequency of reading data from the auxiliary memory.

Although the present invention has been described in connection with the exemplary embodiments of the present invention, it will be apparent to those skilled in the art that various modifications and changes may be made thereto without departing from the scope and spirit of the invention. Therefore, it should be understood that the above exemplary embodiments are not limitative, but illustrative in all aspects.

What is claimed is:

1. An apparatus for reducing a page fault rate in a virtual memory system, the apparatus comprising:
   a main storage unit which stores a page table, the page table comprising a page table entry, the page table entry comprising a reference address used for reading page information of first data from the main storage unit and a flag that indicates whether the page information has been recently read;
   a buffer unit which stores a portion of the page table entry, the portion of the page table entry comprising the reference address for reading the page information of the first data; and
   a processor which reads data from the main storage unit or which stores data in the main storage unit;
   wherein if a page fault for second data requested to be read by the processor from the main storage unit occurs, the processor sets the flag in the page table entry to indicate that the page information has not been recently use searches the buffer unit for the portion of the page table entry corresponding to the page table entry having the set flag, determines that the portion of the page table entry exists in the buffer unit based on a result of the search, and invalidates the portion of the page table entry in the buffer unit for reading the page information of the first data, in response to determining that the portion of the page table entry exists in the buffer unit.

2. The apparatus of claim 1, wherein the page information stored in the main storage unit is removed according to a predetermined page replacement policy selected by the processor.

3. The apparatus of claim 2, wherein the predetermined page replacement policy is performed to remove the page information stored in the main storage unit on a basis of a frequency at which a page including the first data stored in the main storage unit has been read by the processor and information on whether the page including the first data stored in the main storage unit has been recently read.

4. The apparatus of claim 1, wherein the page fault occurs if the second data requested by the processor is not stored in the main storage unit and the main storage unit does not have space sufficient to store a new page including the requested second data.

5. The apparatus of claim 1, wherein when reading the data from or storing the data in the main storage unit, the processor sets the flag in the page table entry to indicate that the page information has been recently read.

6. The apparatus of claim 1, wherein the processor detects whether the reference address of the data exists in the buffer unit before reading the data from the main storage unit,
   wherein when the reference address of the data exists in the buffer unit, the processor reads the data from the main storage unit by using the reference address, and
   wherein when the reference address of the data does not exist in the buffer unit, the processor detects whether the reference address of the data exists in the page table of the main storage unit.

7. The apparatus of claim 1, wherein the data comprises an operator or an operand necessary for an operation of the processor.

8. The apparatus of claim 1, wherein the main storage unit is a RAM (random access memory).

9. A method of reducing a page fault rate in a virtual memory system, the method comprising:
   storing in a main storage unit a page table, the page table comprising a page table entry, the page table entry comprising a reference address used for reading page information of first data from the main storage unit and a flag that indicates whether the page information has been recently read;
   detecting whether a page fault for second data requested to be read from the main storage unit occurs;
   setting the flag in the page table entry to indicate that the page information has not been recently read, in response to detecting the page fault;
   searching a portion of the page table entry stored in a buffer unit for the reference address corresponding to the page table entry having the set flag, in response o setting the flag;
   determining that the portion of the page table entry exists in the buffer unit based on a result of the searching; and
   invalidating the reference address for reading the page information of first data in the portion of the page table entry stored in the buffer unit, in response to determining that the portion of the page table entry exists in the buffer unit.

10. The method of claim 9, further comprising reading the first data from the main storage unit and setting the flag in the page table entry to indicate that the page information has been recently read.

11. The method of claim 9, further comprising executing a page replacement policy of removing one or more pages of a plurality of pages stored in the main storage unit from the main storage unit, and resetting the flag in page table entries corresponding to the one or more pages.

12. The method of claim 9, wherein the page replacement policy uses an NUR (not used recently) algorithm or an LRU (least recently used) algorithm.

* * * * *